Aug. 14, 1951   J. E. BROSSEAU   2,564,321
TIMING DEVICE

Filed Feb. 14, 1947   3 Sheets-Sheet 1

INVENTOR
Joseph E. Brosseau
By [signature]
ATTORNEYS

Aug. 14, 1951   J. E. BROSSEAU   2,564,321
TIMING DEVICE
Filed Feb. 14, 1947   3 Sheets-Sheet 2
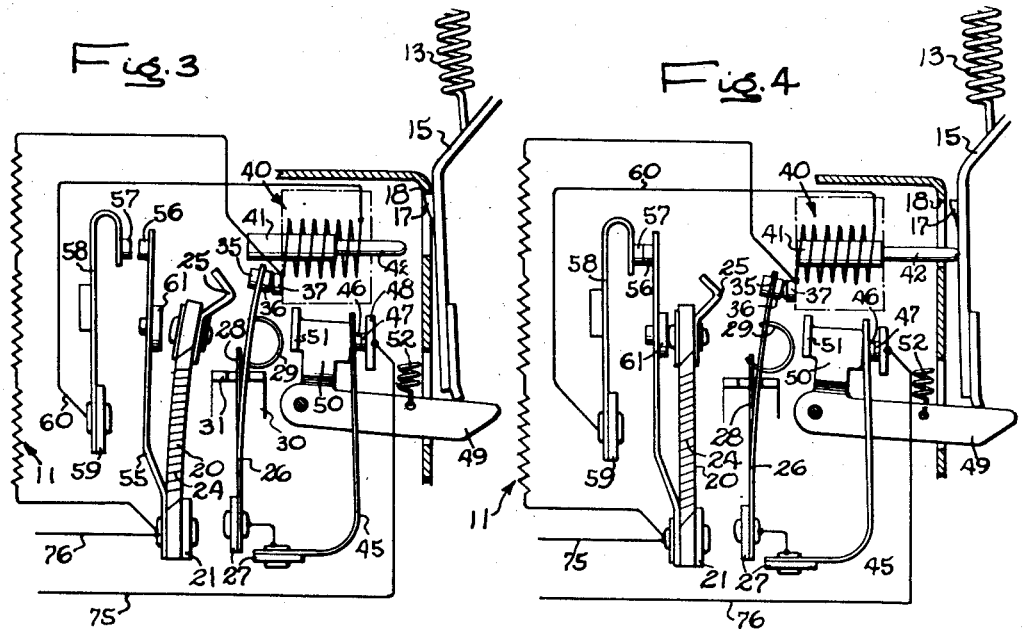
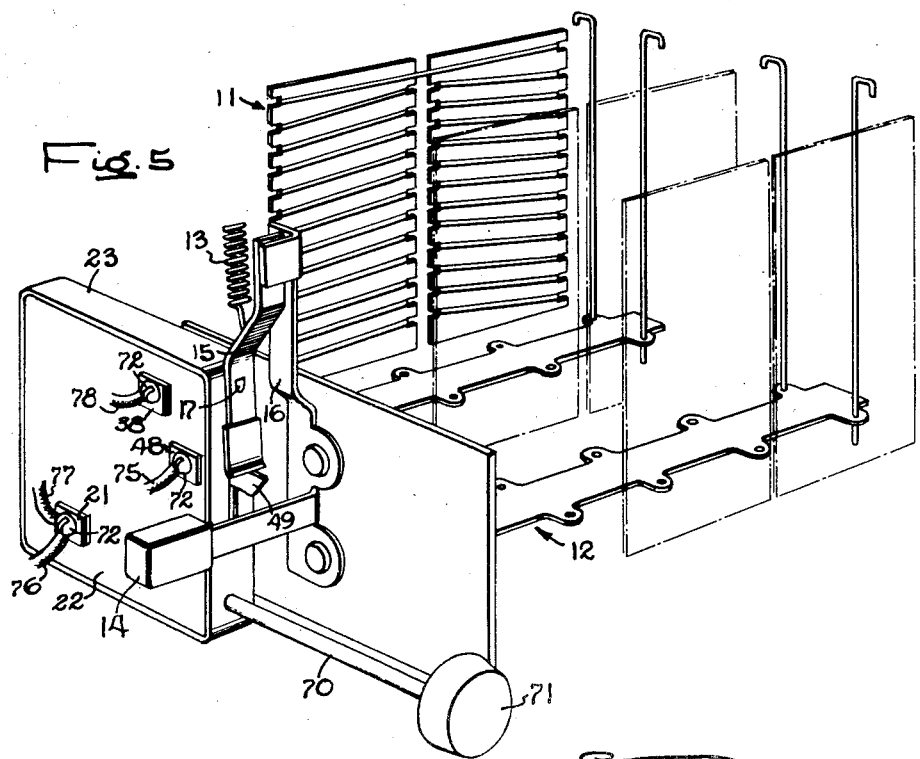
INVENTOR
Joseph E. Brosseau
ATTORNEYS Aug. 14, 1951        J. E. BROSSEAU              2,564,321
                         TIMING DEVICE
Filed Feb. 14, 1947                          3 Sheets-Sheet 3
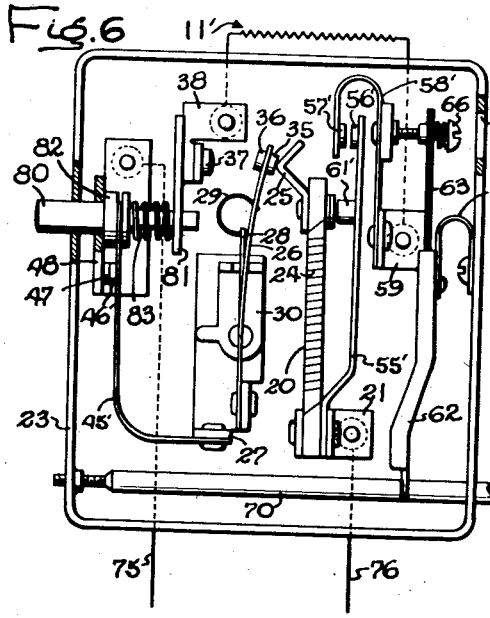
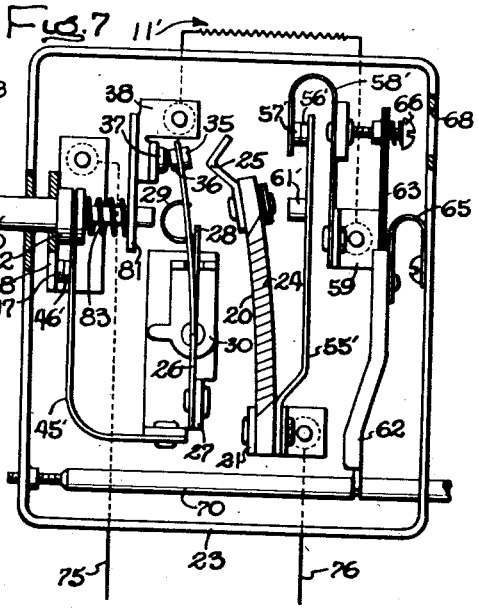
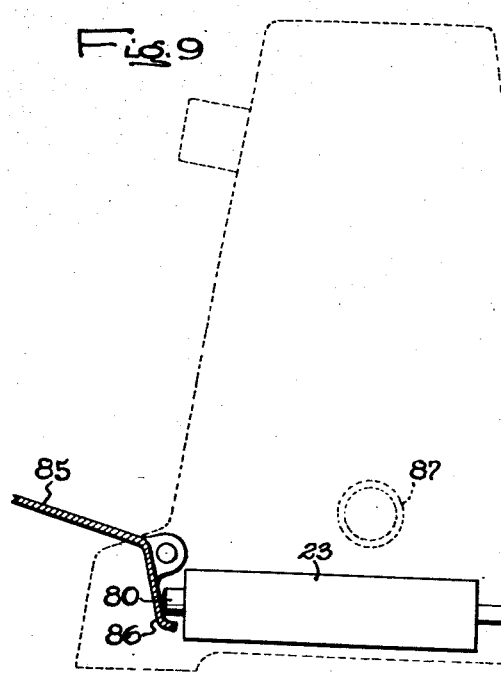
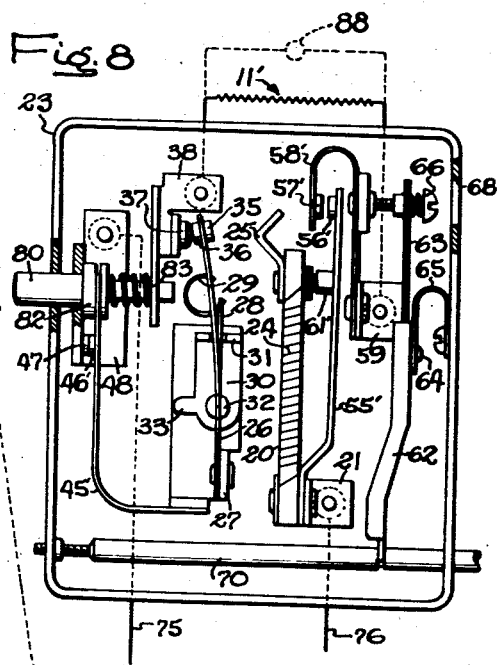
INVENTOR
Joseph E. Brosseau
ATTORNEYS Patented Aug. 14, 1951

2,564,321

UNITED STATES PATENT OFFICE 2,564,321

TIMING DEVICE

Joseph E. Brosseau, Oak Park, Ill., assignor, by direct and mesne assignments, to John B. Brosseau, Oak Park, Ill., and Caroline E. Hoover, as trustees Application February 14, 1947, Serial No. 728,426

12 Claims. (Cl. 161—1)

1

The invention relates to timing devices generally, and more particularly to a thermoelectric timer for timing and controlling the operating periods of electrical appliances or other apparatus intended for intermittent operation.

One object of the invention is to provide a timer of the above general character, which is capable of measuring timed intervals with a high degree of precision and in which the accuracy of the timing is unaffected by variations in the voltage of the operating current supplied thereto.

Another object is to provide a timer in which timed intervals are measured solely by the rate of cooling of a thermally responsive element and in which the element is heated to an elevated temperature only during short periods preceding such timed intervals whereby current consumption is reduced to a minimum and the useful life of the element and the associated heater is materially lengthened.

Another object is to provide a thermoelectric timer adapted upon the heating of a thermally responsive element to a predetermined elevated temperature to start the operation to be timed and to simultaneously interrupt the heating of the element, said device being further operative upon cooling to a predetermined lower temperature to terminate the timed operation.

A further object is to simplify the construction of the timer so that it may be manufactured cheaply, while retaining the desirable characteristics, such as accuracy, ruggedness, adjustability and dependability.

It is also an object of the invention to provide a simple and reliable timer particularly suitable for use in electric toasters or similar cooking apparatus and adapted for automatically regulating the operating periods of the apparatus so as to produce a uniformly cooked product in successive operating periods irrespective of the intervals between such periods.

Other objects and advantages of the invention will become apparent from the following detailed description of the preferred embodiment illustrated in the accompanying drawings, in which:

Fig. 3 is a view similar to Fig. 2 showing the position of the parts at the beginning of the timed interval.

2

Figure 2:
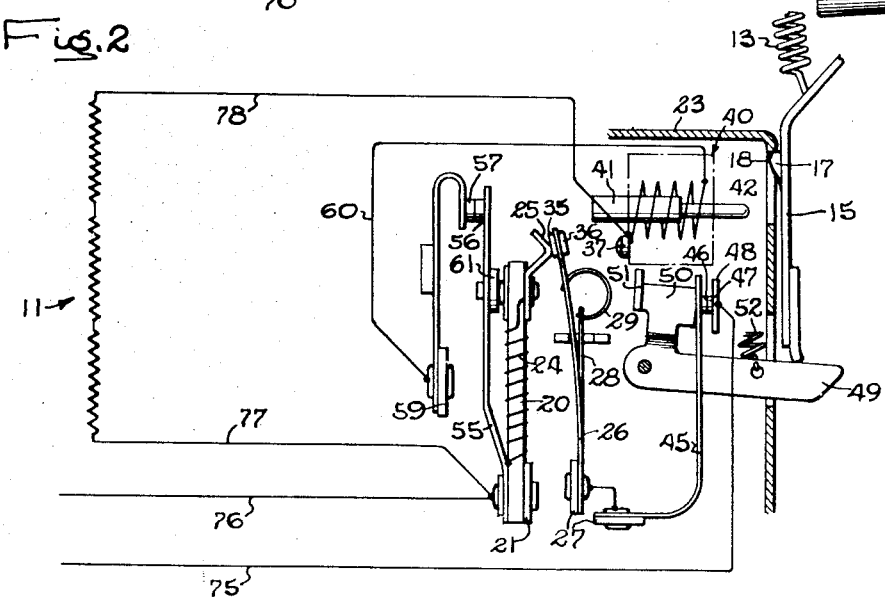
Figure 2 is a diagrammatic view of the timer showing the positions of the parts at the start of an operating cycle.

Fig. 4 is a view similar to Figs. 2 and 3, showing the positions of the parts at the end of the timed interval.

Fig. 5 is a perspective view showing the manner in which the timer is mounted in a toaster for controlling a movable bread rack.

Fig. 6 is a front view of a modified form of timer showing the positions of the parts at the beginning of an operating cycle.

Fig. 7 is a view similar to Fig. 6, showing the positions of the parts at the beginning of the timed interval.

Fig. 8 is a view similar to Figs. 6 and 7, showing the positions of the parts at the end of the timed interval.

Fig. 9 is a view showing the manner in which the modified timer is installed in a toaster of the hinged door type.

While the improved timer is particularly suitable for use with automatic toasters and similar electrical appliances and has been shown and will be described herein in that environment, it may either in the identical form shown or with slight modifications be used to advantage for timing the operating intervals of other types of apparatus. It will be understood therefore that I do not intend to limit the invention to the specific forms disclosed, but intend to cover all modifications, adaptations and alternative constructions falling within the spirit and scope of the invention as expressed in the appended claims.

In accordance with the invention, the timed interval is measured solely by the cooling of a thermally responsive element from a predetermined elevated temperature to a predetermined lower temperature, both of which are preferably substantially above the ambient temperature. The heating of the thermally responsive element to condition it for a timing operation is effected by a heater such as a resistance coil disposed in close proximity to the element and connected in circuit with suitable switch means, including a switch actuated by the element upon reaching the predetermined elevated temperature to start the operation to be timed and to simultaneously open the energizing circuit of the coil and thus interrupt the application of heat to the element. The cooling of the element is thus started at the beginning of the timed interval and the element upon reaching the predetermined lower temperature acts, through the switch means, to terminate the timed operation.

By reason of the above arrangement and relationship of the parts of the timer, the heating coil is energized only for a short period immediately preceding the timing operation, whereby current consumption is reduced to a minimum. Furthermore, the coil and the thermally responsive element are at their maximum temperature only momentarily and their operating lives are thus materially increased. As the time required to raise the element to the desired elevated temperature is excluded from the timed interval, the accuracy of the device is not in any way affected by variations in the voltage of the operating current. Moreover, the lower limit of the cooling range of the element is substantially above the ambient temperature and the accuracy of the device is, therefore, substantially independent of external temperature variations.

Provision is made whereby the timer may be adjusted for different timed intervals within a relatively wide range. Such adjustment may be effected either manually or automatically, the latter being advantageous when it is necessary to compensate for changes in the operating conditions of the apparatus in successive operating cycles.

Referring to Figs. 1–5 of the drawings, the improved timer is there shown as constructed for use in an electrical appliance such as a toaster having a heating element 11 (Figs. 2–5) and a bread rack 12 (Fig. 5) supported on the toaster frame (not shown) for movement into and out of operative relation to the heating element. The bread rack is yieldably urged to a withdrawn or inactive position by a spring 13 and is adapted to be moved to an operated position against the tension of the spring by a hand lever 14 projecting at one end of the toaster. A resilient latch lever 15 pivotally supported on a bracket 16 mounted on and movable with the rack 12 is formed with a latch lug 17 adapted to engage under a stationary abutment 18 to retain the rack in such operated position.

Figure 1:
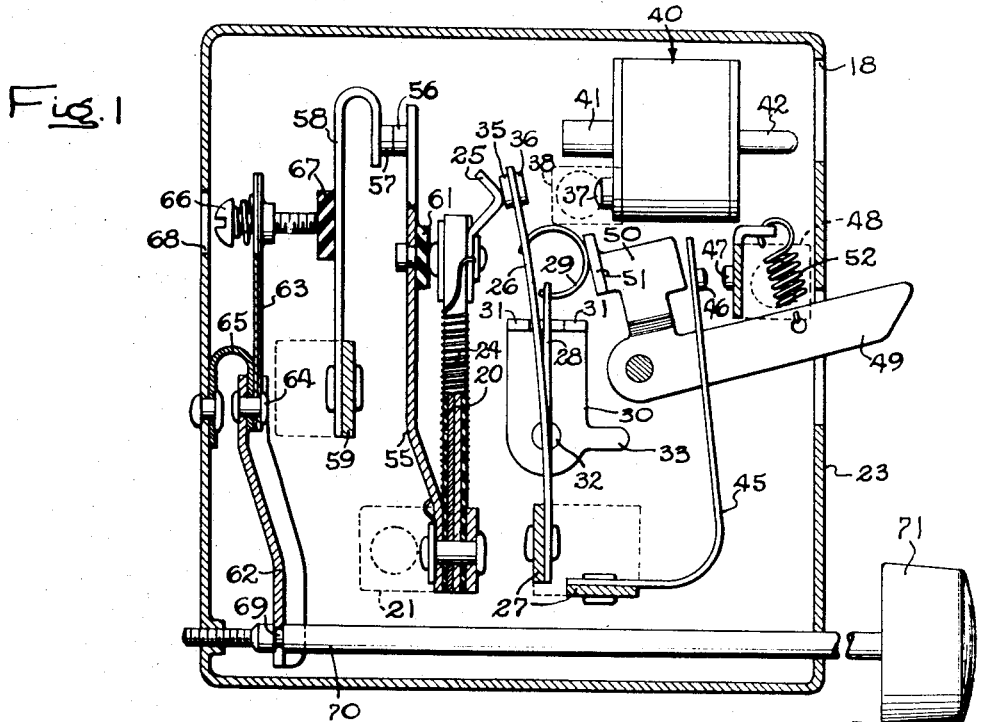
Figure 1 is a partly sectioned view of a thermoelectric timer embodying the features of the invention.

For use in the above environment, the timer is provided with a thermally responsive element in the form of an elongated bimetal strip 20. The element is rigidly supported at one end upon an angular bracket 21 mounted on the inner face of a plate 22 (Fig. 5) of insulating material which forms a cover for a sheet metal box 23 constituting a housing for the timer. For heating the element 20 a coil 24 of resistance wire is wound around the same. Sheets of mica or the like interposed between the coil and the element electrically insulate those parts from each other and serve to slow up the cooling of the element when the heating coil is deenergized. As shown in Fig. 1, one terminal of the coil 24 is connected to the bracket 21 and the other terminal to a contact 25 carried on and electrically insulated from the free end of the element.

Supported at one side of the thermal element 20 for actuation thereby is the movable element of a two-position snap switch by which the circuits of the heating coil 24 and the toaster heating element 11 are controlled, as will appear presently. In the preferred form shown, the movable switch element comprises an elongated flat spring 26 supported at one end on a bracket 27 mounted on the cover plate 22 closely adjacent the bracket 21. The spring 26 is slotted longitudinally and transversely to form a resilient tongue 28 having a common fulcrum with the spring. A generally U-shaped resilient member or spring 29 interposed between the free end of the tongue 28 and the adjacent edge of the spring 26 acts in well known manner to shift the tongue and spring in opposite directions with a snap action when the parts are shifted over a central or neutral position in which the two fulcrum points of the member 29 are disposed in a common plane with the fulcrum of the spring.

In the exemplary timer, the tongue 28 is restrained from movement whereby the snap action movements are imparted to the free end of the spring 26. Such restraint is imposed on the tongue by an adjustable stop member having a flat base 30 with a pair of upstanding fingers 31 straddling the spring 26 and engaging opposite sides of the tongue. The stop member is supported by a pin 32 for pivotal movement about an axis substantially perpendicular to the plane of the spring 26, thus permitting the neutral position of the switch to be shifted toward or from the thermal element 20 for determining the point at which the element is adapted to actuate the switch. A radially projecting finger 33 is provided on the base 30 to facilitate such adjustment. For convenience of illustration, the stop member has been shown on the far side of the spring 26 in Fig. 1, but in practice the member is mounted on the cover plate 22 so that it may be removed as a unit along with the other parts of the timer.

At its free end the spring 26 is provided with double switch contacts 35 and 36. Contact 35 is adapted to cooperate with the contact 25 carried by the thermal element in one position of the switch and contact 36 is adapted to cooperate with a stationary contact 37 when the switch is operated to its alternate position. As herein shown, the contact 37 is carried by a bracket 38 mounted on the cover plate 22. The bracket 38 additionally serves to support a solenoid 40 having a magnetizable plunger 41 fitted with an axially projecting tip 42 of insulating material and adapted to be projected through an opening in the housing 23 to engage the latch member 15 of the bread rack. The abutment 18 for detaining the latch lug 17 of the member is conveniently formed on one side wall of the housing 23 and the solenoid 40 is positioned so that the plunger is effective to disengage the latch from the abutment when the solenoid is energized.

The bracket 27, in addition to supporting the switch element 26, also provides support for a movable switch element or spring 45 having a contact 46 engageable with a stationary contact 47 carried by a bracket 48 mounted on the cover plate 22. The spring 45 is tensioned so that it tends to separate the switch contacts, as shown in Fig. 1. For closing the contacts, an L-shaped actuator lever preferably of non-conducting material is pivotally mounted on the cover plate 22 with one arm 49 projecting through a slot in the side wall of the housing 23 and the other arm 50, which is offset from the first-mentioned arm, disposed in back of the spring 45. One edge of the arm 50 is bent over to form a lug 51 adapted when the actuator is rocked to the "off" position shown in Fig. 1 to engage the resilient member 29 of the snap switch and shift the spring 26 to its first position to close the contacts 35 and 25.

A spring 52 connected between the arm 49 and the bracket 48 yieldably urges the actuator toward the position shown in Fig. 1. In the exemplary embodiment illustrated, the operation of the switch actuator to its alternate position, as shown in Fig. 2, is effected by the handle 14 of the bread rack upon movement of the rack to operated position. In this position of the actuator, the switch contacts 46 and 47 are closed and the lug 51 is withdrawn from engagement with the resilient member 29, thus conditioning the snap switch for operation by the thermal element 20.

As the thermal element 20 is heated, its free end swings to the right, as viewed in the drawing, carrying the spring 26 with it until the latter passes over the neutral position. The spring then snaps over to its alternate position, as shown in Fig. 3, opening the contacts 25—35, closing the contacts 36 and 37. The point at which this action takes place, or in other words, the maximum temperature to which the thermal element must be heated to actuate the switch is thus determined by the setting of the neutral point of the switch through adjustment of the stop 30—31, as heretofore explained.

Supported at one end on the bracket 21 adjacent the rear face of the thermal element 20 and in electrical contact with the bracket is a switch member or spring 55 having at its free end a contact 56 cooperating with a contact 57 carried on the free end of a spring 58. The latter spring is supported on and in electrical contact with a bracket 59 mounted on the cover plate 22. The bracket 59 in this instance is connected by a wire or bus bar 60 with one terminal of the solenoid 40, the other terminal of the solenoid being connected to the bracket 38 which carries the switch contact 37.

In the particular switch organization shown, the spring 55 is tensioned so that it tends to bend to the right, as viewed in the drawing, that is, in a direction to separate the contacts 56 and 57. It is actuated to close the switch contacts by the thermal element 20 when the latter cools to or below a predetermined temperature, which may be substantially above the ambient temperature. Such actuation of the switch member is effected by the thermal element engaging a pad 61 of insulating material suitably secured to the spring 55.

Provision is made for adjusting the position of the spring 58 and its contact 57 so as to accurately determine the temperature at which the thermal element 20 is effective to close the switch contacts. The adjusting means shown is double acting, that is, it may be operated manually and it also operates automatically to compensate for changes in the ambient temperature. Referring to Fig. 1 of the drawings, the adjusting means in its preferred form comprises a lever having a rigid lower section 62 and an upper section 63 of thermally responsive material such as a bimetal strip. The two sections of the lever are secured together, as by a rivet 64, which also serves to anchor them to one end of a U-shaped resilient fulcrum member 65 riveted or otherwise rigidly attached to a side wall of the housing 23.

Threaded through the upper or free end of the bimetal strip 63 is a stop screw 66 (Fig. 1) adapted to engage a pad 67 of insulating material carried by the spring 58. The spring is tensioned so that it normally tends to bend to the left, such bending being limited by engagement with the stop screw 66. The position of the stop screw in turn is varied by temperature changes acting on the bimetal strip 63, the stop screw being shifted to the right as the ambient temperature increases and returning to the left as the ambient temperature decreases. An opening 68 in the side wall of the housing 63 provides access to the stop screw 66 for adjustment.

For manual adjustment of the spring 58, the rigid arm 62 of the adjusting lever is notched to fit over a reduced section 69 of an adjusting rod 70 which has one end threaded into a boss formed on the side wall of the housing 23. The other end of the rod is extended through the opposite side wall of the housing and is provided with a knob 71 for manual manipulation. Accordingly, by turning the rod in one direction or the other, the adjusting lever may be rocked on its fulcrum to vary the position of the spring 58 and its contact 57.

Referring to Fig. 5 of the drawings, it will be observed that the brackets 21, 38 and 48 are formed so as to prevent terminal portions on the outer face of the cover plate 22. These terminal portions provide convenient means for interconnecting the electrical elements of the apparatus to be controlled with the timer, the connections being made by means of screws 72 threaded into the terminals. Installation of the timing device is thus greatly simplified and current losses are reduced to a minimum since the contactors are connected directly to the electrical elements of the timer. In the exemplary toaster, only four short wires are required for connecting the timer in controlling relation to the heating element and bread rack of the toaster. Wires 75 and 76 connected with or constituting the two conductors of a current supply cord are connected respectively with brackets 48 and 21. Two additional wires 77 and 78 connect opposite terminals of the toaster heating element 11 with the brackets 21 and 38. It will be understood, of course, that when the timing device is used with apparatus other than toasters, the brackets 21 and 38 are connected to the circuit to be controlled.

The operating cycle of the timer is initiated by closure of the main switch contacts 46 and 47 in this instance by movement of the bread rack to its operated position. In this movement the latch lever 15 engages the actuator lever 49 and rocks it from the position shown in Fig. 1 to the position shown in Fig. 2. Closure of the contacts 46 and 47 completes an energizing circuit for the heating coil 24 from the line conductor 75, springs 45 and 26, contacts 25 and 35, winding of the coil 24 to line conductor 76. It will be observed that the heating element 11 of the toaster is not energized at this time as its circuit is open at the contacts 36—37.

Heat generated in the coil 24 raises the temperature of the thermal element 20, warping the free end of the element to the right as shown in Fig. 3. In the initial movement of the element, contact 56 is separated from contact 57. When the element reaches the predetermined elevated temperature for which the snap switch 26—28 is set, the spring 26 snaps over center, separating contacts 25—35 and closing contacts 36—37. The closure of the latter contacts completes the circuit for the toaster heating element 11 and thus starts the toasting operation which is to be timed. Separation of the contacts 25—35 opens the circuit of the coil 24, thereby interrupting the application of heat to the thermal element 20 and initiating the timing operation.

As the thermal element 20 cools, its free end swings to the left and engages the spring 55 to close the switch contacts 56—57. The position of the contact 57 is adjustable, of course, so that the contacts engage when the thermal element cools to a predetermined temperature below its maximum temperature. Closure of these contacts completes the circuit for the solenoid 40, which energizes and disengages the latch lug 17 from the latching abutment 18. The spring 13 then returns the bread rack to its upper or inactive position, releasing the switch actuator 49 for return to normal rest position by the spring 52. In the event that the bread rack fails to rise, continued energization of the solenoid 40 forces the latch lever 15 over the end of the actuator lever 49 to release the same.

Upon its return the switch actuator separates the switch contacts 46—47, thus shutting off the current to the timer and terminating the operating cycle of the toaster heating element. The actuator additionally rocks the snap switch spring 26 to the position shown in Fig. 1, thereby preparing the circuit for the heating coil 24 in the next operating cycle of the toaster.

In successive operating cycles as the residual temperature of the toaster gradually increases, the ambient temperature in the timer housing 23 will correspondingly increase due to conduction through the walls of the housing 23. Thermal strip 63 responds to this increase in ambient temperature by bending to the right, thus gradusually shifting the position of the contact 57 so that it is engaged by contact 56 at progressively higher temperatures of the thermal element 20. The timed intervals are thus automatically and progressively decreased to compensate for the increase in the residual heat of the toaster, thereby insuring uniform toast in successive operating cycles irrespective of the spacing of such cycles. The lengths of the toasting periods may also be varied by manipulation of the knob 71, as heretofore explained, without in any way interfering with the automatic adjustment to insure uniformity of the product.

The modified timer shown in Figs. 6–8 of the drawings differs from that above described primarily in that it is arranged so that the opening and closing of the circuit to be controlled is effected directly by the thermally responsive element 20. For this purpose the control circuit is connected across the terminals provided by the brackets 38 and 59. Bracket 38 carries the switch contact 37 which cooperates with the contact 36 of the snap switch to connect one side of the control circuit to the line conductor 75.

The other side of the control circuit is connected to the other line conductor 76 by a control switch which is normally open, but which closes upon the initial response of the element 20 to the heat generated by the coil 24. This switch is again opened when the element 20 cools down to a predetermined lower temperature, thus interrupting the control circuit after an interval measured solely by the cooling down period of the thermally responsive element.

As shown in Figs. 6–8 of the drawings, the control switch in its preferred form includes a movable switch member or spring 55' supported at one end by and in electrical contact with the terminal bracket 21 which supports the thermal element. At its free end the spring 55' carries a contact 56' cooperating with a contact 57' carried by a stationary switch member or spring 58' supported on and in electrical contact with the terminal bracket 59. The spring 55' is tensioned so that it tends to close the switch contacts 56'—57', but the contacts are normally held open by the thermal element 20 when cold by reason of the engagement of the element with an insulating pad 61' carried by the spring. The precise temperature at which the switch is opened in the cooling of the thermal element is determined by the setting of the adjusting lever 62—63, as heretofore described.

The modified timer has also been shown as equipped with a main switch which differs somewhat structurally from the corresponding switch heretofore described, but which functions in the same manner. As shown, the main switch has a movable member or spring 45' supported at one end on and in electrical contact with the snap switch supporting bracket 21. The spring 45' has a switch contact 46' normally held by the tension of the spring in engagement with the contact 47 carried by the bracket 48. A plunger 80 slidably supported by the bracket 48 and an extension 81 of the bracket 38 is formed with a collar 82 circumferentially grooved to receive the free end of the spring 45'. A coil spring 83 interposed between the extension 81 and the collar 82 yieldably urges the plunger to the position shown in Fig. 6, in which the switch contacts 46'—47 are closed. When the plunger is pushed inwardly, the switch contacts are separated.

The plunger 80 additionally serves as a means for actuating the movable element or spring 26 of the snap switch from the running position shown in Fig. 7 to the starting position shown in Fig. 6. Thus, when the snap switch is operated to close the switch contacts 25—35 and prepare the circuit for the heating coil 24, the main switch contacts 46'—47 are opened to cut off the supply of current to the timer. Accordingly, the operating cycle of the timer is initiated upon release of the plunger and the subsequent closure of the main switch contacts.

Fig. 9 shows the timer as installed in a toaster having a pivotally supported door or bread rack 85. The timer is preferably mounted below the heating chamber of the toaster with the plunger 80 disposed below and closely adjacent the pivotal axis of the door. The latter is formed with an extension 86 operative to engage the plunger and push it inwardly when the door is swung to the open position in which it is shown in full lines in the drawing. Accordingly, when the door is opened to load the toaster, the main switch of the timer is opened to cut off the current supply for the timer and the snap switch is set for establishing the operating circuit for the heating coil 24.

When the toaster door 85 is shut, the main switch closes to start the operating cycle of the timer in the manner heretofore described. In this cycle the thermal element 20 is heated to the predetermined elevated temperature required to operate the snap switch from the position shown in Fig. 6 to the position shown in Fig. 7. The control switch contacts 56'—57' having closed in the initial movement of the thermal element, the heating element 11' of the toaster is accordingly energized upon the operation of the snap switch. The operation of the toaster heating element 11' continues while the thermal element cools down sufficiently to open the control switch contacts 56'—57', thus terminating the operating period of the toaster.

In order to provide a visual indication of the progress of the toasting operation and particularly to notify the user that the operation has been terminated, the toaster may be fitted with a suitable transparent window or lens 87 through which the glowing of the toaster heating element 11' may be observed. Alternatively, a separate glow element or small incandescent lamp 88 may be mounted in back of the window 87 and connected in circuit with the element 11' of the toaster, as shown in broken lines in Fig. 8.

It will be apparent from the foregoing that the invention provides a thermoelectric timer of novel and advantageous construction. Intervals to be timed are measured solely by the cooling period of a thermally responsive element, thus rendering the timer independent of variations in the voltage of the operating current supplied thereto. Through the novel circuit arrangement provided, the thermally responsive element is heated only for a short period immediately preceding the interval to be timed and maximum temperature is maintained only momentarily. The timer may be adjusted for varying time intervals and provision is made for automatically adjusting the same to compensate for changes in the operating conditions of the apparatus with which it is associated.

Simplicity of construction with its attendant reduction in cost is attained without sacrifice of durability or dependability. Moreover, the improved timer may be constructed as a compact self-contained unit for convenient installation in the apparatus to be controlled and timed.

I claim:

1. A timer comprising, in combination, a thermally responsive element, a heating coil located closely adjacent said element for heating the same, a snap-over switch comprising a movable member supported at one side of said element, a spring acting between said member and a relatively stationary fulcrum to shift the member into either of two positions on opposite sides of a neutral point, said member being operative in one position to close a circuit for said heating coil, said thermally responsive element operating when heated to a predetermined elevated temperature to actuate said member for snap-over movement to its alternate position whereby to open the circuit for said heating coil, and means for adjusting the fulcrum of said spring to change the neutral position of said snap-over member thereby to determine the maximum temperature to which said element is heated.

2. A timer comprising, in combination, a thermally responsive element, a heating coil located closely adjacent said element for heating the same, a snap-over switch member supported at one side of said element, said member being operative in one position to close a circuit for said heating coil and in its alternate position to close an external circuit, said thermally responsive element operating when heated to a predetermined elevated temperature to actuate said member for snap-over movement from said one position to said alternate position, and other switch means operable by said element upon cooling to a predetermined lower temperature for controlling the external circuit.

3. A timer comprising, in combination, a thermally reponsive element, an electrical heater for said element, a two position snap switch operative in one position to close a circuit for said heater and in another position to close a controlled circuit, said thermally responsive element being operative to actuate said switch from said one position to said other position upon being heated to a predetermined elevated temperature, and a second switch actuated by said thermally responsive element upon cooling to a predetermined lower temperature for interrupting said controlled circuit.

4. A timer comprising, in combination, a thermally responsive element, an electrical heater for said element, a circuit for said heater, a first normally closed switch in said heater circuit, a second normally open switch for controlling an external circuit, a third normally closed switch adapted to be opened upon the initial response of said element to the heat generated by said heater, said element being operative when heated to a predetermined elevated temperature for opening said first switch to interrupt the operation of said heater and to close said second switch, said element being further operative upon cooling to a predetermined lower temperature for closing said third switch, and a control device for said external circuit operated upon the closure of said third switch and while said second switch is closed.

5. A timer comprising, in combination, a thermally responsive element, an electrical heater for said element, a circuit for said heater including a first normally closed switch, a second normally open switch adapted to be connected in an external circuit to be controlled, a third normally open switch adapted to be connected in said external circuit, said third switch being closed upon the initial response of said element to the heat generated by said heater, said element being operative when heated to a predetermined elevated temperature for opening said first switch to interrupt the operation of said heater and to close said second switch to complete the external circuit, said element being further operative upon cooling to a predetermined lower temperature for opening said third switch to interrupt the external circuit.

6. A timer for use in an electrical appliance having an operating circuit, said timer comprising a thermally responsive element, an electrical heater for said element, a circuit for said heater, a first normally closed switch in said heater circuit, a second normally open switch in said operating circuit, a third normally closed switch adapted to be opened upon the initial response of said element to the heat generated by said heater, said element being operative when heated to a predetermined elevated temperature for opening said first switch to interrupt the operation of said heater and to close said second switch to complete said operating circuit, said element being further operative upon cooling to a predetermined lower temperature for closing said third switch, and a control device operated upon closure of said third switch while said second switch is closed for causing said operating circuit to be opened.

7. A timer for use in an electrical appliance having an operating circuit, said timer comprising a thermally responsive element, an electrical heater for said element, a circuit for said heater, a first normally closed switch in said heater circuit, a second normally open switch in said operating circuit, a third normally open switch in said operating circuit, said element being operative upon its initial response to the heat generated by said heater for closing said third switch and upon being heated to a predetermined elevated temperature for opening said first switch to interrupt the operation of said heater and for closing said second switch to complete the operating circuit, said element being further operative upon cooling to a predetermined lower temperature for opening said third switch to interrupt said operating circuit.

8. Mechanism for timing the operating periods of an appliance having an element yieldably urged to an inactive position and adapted to be shifted to and releasably latched in an operated position and a solenoid adapted when energized to release the element from latched position, said mechanism including a bimetal strip adapted to flex in one direction when heated and in the opposite direction upon cooling, a heating coil for said bimetal strip, a first switch open when the element is in its inactive position and closed upon the movement of the element to operated position, a second two position snap switch operated to one position upon movement of the element to its inactive position and operated to its alternate position by said bimetal strip when heated to a predetermined elevated position, a third switch closed by said bimetal strip when cooled to a predetermined temperature below said elevated temperature, an energizing circuit for said coil including said first switch and said second switch in said one position, a circuit for the appliance including said first switch and said second switch in its alternate position, and a circuit for said solenoid including said first switch, said second switch in its alternate position and said third switch.

9. Mechanism for timing the operating periods of an appliance having an element yieldably urged to an inactive position and adapted to be moved to and latched in an operated position and a solenoid operative when energized to release the latched element for return to its inactive position, said mechanism comprising a bimetal strip adapted to flex in one direction when heated and in the opposite direction upon cooling, a heating coil for said bimetal strip, switch means operable upon the movement of the element to operated position for closing the circuit for said coil to initiate the heating of said bimetal strip, other switch means operated by said bimetal strip when heated to a predetermined elevated temperature for interrupting the circuit of said coil, for closing the operating circuit for the appliance and for preparing the circuit for said solenoid, and still other switch means operated by said bimetal strip upon cooling to a predetermined lower temperature for completing the energizing circuit for said solenoid, said element in returning to its inactive position actuating said first switch means and said other switch means to interrupt the circuits for the appliance and said solenoid and to prepare the circuit of said coil for the next operating cycle of the appliance.

10. Mechanism for timing the operating periods of an appliance having a control element yieldably urged to an inactive position, manually operable means for moving the element to an operative position, means for latching the element in said operative position, and a solenoid operative when energized to release said latch, said mechanism including a bimetal strip anchored at one end, a resistance coil for heating said strip, a two position switch operative in one position to close a point in the circuit for said coil and in its other position to close a point in the circuit of said solenoid, a second switch in the circuit of said solenoid open when said bimetal strip is heated and closed when the strip is cold, a third switch closed incident to the latching of the control element in operative position to complete a circuit for said coil including said two position switch in said one position, said bimetal strip being operative when heated to a predetermined elevated position to operate said two position switch to its other position and thereby open the circuit for said coil to interrupt the heating of said strip and close the operating circuit for appliance to initiate the operating of the same, said bimetal strip on cooling to a predetermined lower temperature acting to close said second switch and thereby complete an energizing circuit for said solenoid, said solenoid when energized releasing said latch to permit the control element to return to its inactive position, the return of the control element being effective to shift said two position switch back to said one position, to open the solenoid circuit and to open said third switch and thereby interrupt the circuit of the appliance to terminate its operating period.

11. A timer comprising, in combination, a thermally responsive element, a heater for said element, a switch comprising a movable member having an over center spring to shift it to either of two positions on opposite sides of a neutral position, means for shifting said switch member to one of said positions to close an operating circuit for said heater, said thermal element being operative when heated to shift said switch member from said one position through said neutral position whereby to cause the member to open the circuit for said heater, and a control switch actuated by said thermal element upon initial application of heat thereto by said heater and reactuated by the element upon cooling down to a predetermined temperature.

12. A timer comprising, in combination, a thermally responsive element, a heater for said element, a switch including a movable member and an associated over center spring operative to shift the member to either of two positions on opposite sides of a neutral position, a first set of switch contacts closed by said member in one position and open when the member is in its alternate position, a second set of contacts closed by said member in said alternate position and open when the member is in said one position, a circuit for said heater including said first set of switch contacts, means for shifting said member to said one position to close said first set of contacts and initiate the operation of said heater, said thermally responsive element being operative in response to the heat generated by said heater to shift said movable member from said one position through the neutral position and thereby cause said member to open said first set of switch contacts and close said second set of switch contacts, the opening of said first set of switch contacts acting to interrupt the operation of said heater and initiate the cooling of said thermally responsive element, a third set of switch contacts actuated by said thermally responsive element upon initial application of heat thereto by said heater and reactuated by the element upon cooling down to a predetermined temperature, and a control circuit including said second and third sets of switch contacts.

JOSEPH E. BROSSEAU.

REFERENCES CITED

The following references are of record in the file of this patent:

UNITED STATES PATENTS

| Number | Name | Date |
|---|---|---|
| 2,170,070 | Deleray | Aug. 22, 1939 |
| 2,234,764 | Ireland | Mar. 11, 1941 |
| 2,236,402 | Gomersall | Mar. 25, 1941 |
| 2,281,319 | Newell | Apr. 28, 1942 |
| 2,325,551 | Scharf | July 27, 1943 |
| 2,367,500 | Huck | Jan. 16, 1945 |
| 2,436,735 | Walder et al. | Feb. 24, 1948 |